US009436867B2

(12) United States Patent
Kimura

(10) Patent No.: US 9,436,867 B2
(45) Date of Patent: Sep. 6, 2016

(54) IMAGE PROCESSING METHOD USING SPARSE CODING, AND NON-TRANSITORY COMPUTER-READABLE STORAGE MEDIUM STORING IMAGE PROCESSING PROGRAM AND IMAGE PROCESSING APPARATUS

(71) Applicant: CANON KABUSHIKI KAISHA, Tokyo (JP)

(72) Inventor: Yoshinori Kimura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 75 days.

(21) Appl. No.: 14/573,151

(22) Filed: Dec. 17, 2014

(65) Prior Publication Data
US 2015/0178894 A1 Jun. 25, 2015

(30) Foreign Application Priority Data
Dec. 20, 2013 (JP) .................................. 2013-263173

(51) Int. Cl.
| G06K 9/36 | (2006.01) |
| G06K 9/00 | (2006.01) |
| G06K 9/62 | (2006.01) |
| H04N 19/94 | (2014.01) |
| G06K 9/40 | (2006.01) |

(52) U.S. Cl.
CPC ........... *G06K 9/0014* (2013.01); *G06K 9/6255* (2013.01); *H04N 19/94* (2014.11); *G06K 9/40* (2013.01)

(58) Field of Classification Search
None
See application file for complete search history.

(56) References Cited

PUBLICATIONS

Julien Mairal et al., Learning Multiscale Sparse Representations for Image and Video Restoration, IMA Preprint Series # 2168, ( Jul. 2007 ), Institute for Mathematics and Its Applications University of Minnesota, 28 pages total (2 cover pages, and pp. 1-26 of the actual article).*

Elad et al., "Image Denoising Via Sparse and Redundant Representations Over Learned Dictionaries", IEEE Transactions on Image Processing, U.S.A., Dec. 2006, vol. 15, No. 12, pp. 3736-3745.

Yang et al., "Couple Dictionary Training for Image Super-Resolution", IEEE Transactions on Image Processing, U.S.A., Mar. 13, 2012, vol. 21, No. 8, pp. 3467-3478 (also numbered as pp. 1-27).

* cited by examiner

*Primary Examiner* — Brian P Werner
(74) *Attorney, Agent, or Firm* — Rossi, Kimms & McDowell LLP

(57) ABSTRACT

The method produces, from a first image, a second image with sparse coding. The method produces, from the first image, a processing intermediate image having a pixel value distribution that a difference among pixel values in a region of the intermediate image is equal to a DC component in a corresponding region of the first image, performs a first process of acquiring, using an AC component in a first region of the intermediate image and a basis produced by dictionary learning, an AC component in a second region, performs a second process of acquiring a difference among pixel values in the second region as a DC component in a corresponding region of the second image, and repeats the first and second processes with changing a position of the first region in the intermediate image to acquire DC components in regions of the second image.

7 Claims, 11 Drawing Sheets

DC COMPONENT IN SMALL REGION AT CERTAIN POSITION IN INPUT IMAGE

EXPRESSIONS (1) AND (2)

CORRESPONDING SMALL REGION OF INTERMEDIATE IMAGE

EXPRESSION (3)

IMAGE PROCESSING METHOD USING SPARSE CODING, AND NON-TRANSITORY COMPUTER-READABLE STORAGE MEDIUM STORING IMAGE PROCESSING PROGRAM AND IMAGE PROCESSING APPARATUS

BACKGROUND OF THE INVENTION

1. Field of the Invention

The present invention relates to an image processing technology for newly producing an image by sparse coding from a given image.

2. Description of the Related Art

Various image processes are performed using a technology of subtracting, from a pixel value distribution in an arbitrary partial region of a known image, an average pixel value (DC component) in the partial region to acquire a component (AC component) and of converting the AC component into an AC component in a partial region of an unknown image corresponding to the partial region of the known image.

For example, Michael Elad, Michal Aharon, "Image Denoising Via Sparse and Redundant Representations Over Learned Dictionaries", Transactions on Image Processing, U.S.A., IEEE, 2006, Vol. 15, Issue 12, pp. 3736-3745, which is hereinafter referred to as Literature 1, discloses an image processing method capable of performing a noise removal process which produces an original image including no noise from a degraded image including the noise. Specifically, the method first estimates, from an AC component in a small region (hereinafter, referred to as "an extraction region") arbitrarily extracted in the degraded image, an AC component including no noise in a small region (hereinafter, referred to as "a corresponding region") in the original image corresponding to the extraction region. Next, the method adds together a DC component in the extraction region of the degraded image and the estimated AC component to estimate a pixel value distribution in the corresponding region of the original image. The method performs the above processes on an entire degraded image to produce the original image in which the noise is removed.

Jianchao Yang, Zhaowen Wang, Zhe Lin, Scott Cohen, Thomas Huang, "Couple Dictionary Training for Image Super-Resolution", Transactions on Image Processing, U.S.A., IEEE, 2012, Vol. 21, Issue 8, pp. 3467-3478, which is hereinafter referred to as Literature 2, discloses an image processing method capable of performing super-resolution processing of acquiring, from a low resolution image (degraded image) produced by performing degradation processing such as decimation of pixels on a high resolution image, a high resolution image equivalent to that before the degradation processing. Specifically, the method first performs interpolation processing by a nearest neighbor method or the like on the low resolution image to produce an intermediate image having a high resolution. Since this intermediate image is smoothed through the interpolation processing, the method estimates, an AC component in an arbitrary extraction region of the intermediate image, an unsmoothed AC component in a corresponding region of the high resolution image. Next, the method adds together a DC component in the extraction region of the intermediate image and the estimated AC component to estimate a pixel value distribution in the corresponding region of the high resolution image. The method performs the above processes on an entire intermediate image to produce a high resolution image subjected to the super-resolution processing. The image processing methods disclosed in Literatures 1 and 2 each use bases previously produced by dictionary learning from the AC components in multiple small regions extracted from training images before and after their degradation. Such image processing methods are each called "a sparse representation-based image processing method, or "sparse coding" to be used in the following description. The basis is a set of elements as the small regions produced by dictionary learning. The training image is an image for producing the basis by dictionary learning.

The sparse coding disclosed in Literatures 1 and 2 is based on an assumption that the DC component in the extraction region of the degraded image and the intermediate image which are each an input image is equal to the DC component in the corresponding region of the original image and the high resolution image which are each an output image. Thus, when this assumption holds, the output image can be produced from the input image accurately.

However, this assumption does not hold in many cases. For example, these cases include a case of performing a color conversion of an image of a pathological sample stained with a certain color into an image of a pathological sample stained with another color and a case of calculating, from a sample image of an unknown sample captured through a partially coherent imaging system, a complex amplitude distribution of light transmitted through the sample. In these cases, the DC component in the extraction region of the input image differs from the DC component in the corresponding region of the output image, so that the sparse coding disclosed in Literatures 1 and 2 cannot be directly applied thereto.

SUMMARY OF THE INVENTION

The present invention provides an image processing method and apparatus capable of accurately acquiring, from an input image, a DC component in an output image.

The present invention provides as an aspect thereof an image processing method of producing, from a first image, a second image by using sparse coding. The method includes when an average pixel value in a partial region of an image is referred to as a DC component, and a component acquired by subtracting the DC component from a pixel value distribution in the partial region is referred to as an AC component: producing, from the first image, a processing intermediate image having a pixel value distribution in which a difference among multiple pixel values in a partial region of the processing intermediate image is equal to the DC component in a partial region of the first image corresponding to the partial region of the processing intermediate image; performing a first process of acquiring, by using the AC component in a first partial region extracted in the processing intermediate image and a basis produced by dictionary learning, the AC component in a second partial region; and performing a second process of acquiring a difference among multiple pixel values in the second partial region as the DC component in a partial region of the second image corresponding to the second partial region. The method repeats the first and second processes with changing a position of extracting the first partial region in the processing intermediate image to acquire the DC components in multiple partial regions of the second image.

The present invention provides as another aspect thereof a non-transitory computer-readable storage medium storing an image processing program that causes a computer to execute an image process of producing, from a first image, a second image by sparse coding. The image process includes when an average pixel value in a partial region of an image is referred to as a DC component, and a component acquired by subtracting the DC component from a pixel value distribution in the partial region is referred to as an AC component: producing, from the first image, a processing intermediate image having a pixel value distribution in which a difference among multiple pixel values in a partial region of the processing intermediate image is equal to the DC component in a partial region of the first image corresponding to the partial region of the processing intermediate image; performing a first process of acquiring, by using the AC component in a first partial region extracted in the processing intermediate image and a basis produced by dictionary learning, the AC component in a second partial region; and performing a second process of acquiring a difference among multiple pixel values in the second partial region as the DC component in a partial region of the second image corresponding to the second partial region. The image process repeats the first and second processes with changing a position of extracting the first partial region in the processing intermediate image to acquire the DC components in multiple partial regions of the second image.

The present invention provides as still another aspect thereof an image processing apparatus configured to produce, from a first image, a second image by sparse coding. The apparatus includes when an average pixel value in a partial region of an image is referred to as a DC component, and a component acquired by subtracting the DC component from a pixel value distribution in the partial region is referred to as an AC component: an image producer configured to produce, from the first image, a processing intermediate image having a pixel value distribution in which a difference among multiple pixel values in a partial region of the processing intermediate image is equal to the DC component in a partial region of the first image corresponding to the partial region of the processing intermediate image; a first processor configured to perform a first process of acquiring, by using the AC component in a first partial region extracted in the processing intermediate image and a basis produced by dictionary learning, the AC component in a second partial region; and a second processor configured to perform a second process of acquiring a difference among multiple pixel values in the second partial region as the DC component in a partial region of the second image corresponding to the second partial region. The image producer is further configured to repeat the first and second processes with changing a position of extracting the first partial region in the processing intermediate image to acquire the DC components in multiple partial regions of the second image.

Other aspects of the present invention will become apparent from the following description and the attached drawings.

DESCRIPTION OF THE EMBODIMENTS

Exemplary embodiments of the present invention will be described below with reference to the accompanied drawings.

Embodiment 1

Figure 1:
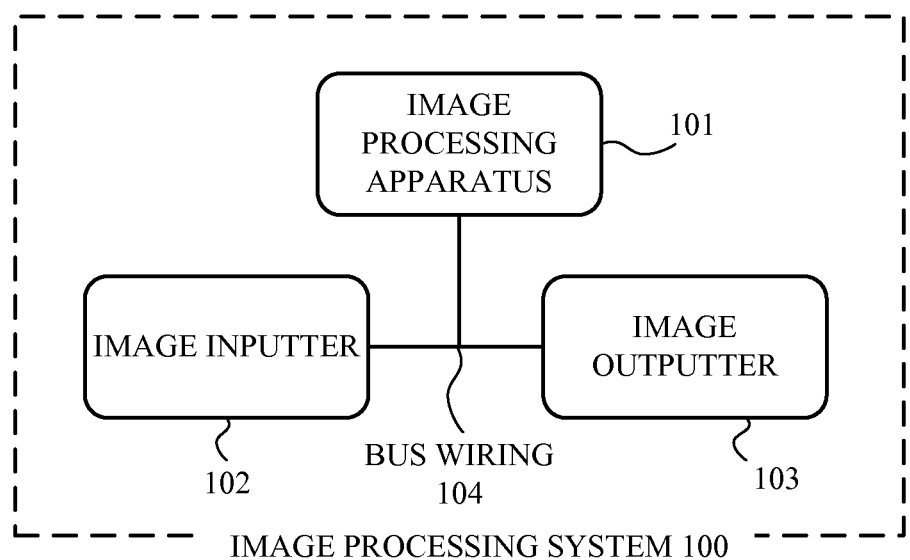
FIG. 1 is a block diagram illustrating a configuration of an image processing system of Embodiment 1 of the present invention.

FIG. 1 illustrates a configuration of an image processing system of a first embodiment (Embodiment 1) of the present invention. This image processing system 100 includes an image processing apparatus 101, an image inputter 102, an image outputter 103 and bus wiring 104. The image processing apparatus 101, the image inputter 102 and the image outputter 103 are connected to one another through the bus wiring 104.

The image inputter 102 constituted by a digital camera or a slide scanner and inputs an input image to the image processing apparatus 101. The slide scanner is a pathological sample image acquiring apparatus to be used for pathological diagnosis. The image inputter 102 may be constituted by an interface device such as a CD-ROM drive and a USB interface that read out the input image from a non-transitory computer-readable storage medium such as a USB memory and a CD-ROM each storing digital image data. The input image is a monochrome image having two-dimensionally arranged data of luminance values, or a color image having two-dimensionally arranged data of luminance values for each of RGB colors. A color space of the color image is not limited to RGB, and may be, for example, YCbCr or HSV.

The image outputter 103 is constituted by a display device such as a liquid crystal display and outputs an output image from the image processing apparatus 101. The image outputter 103 may be constituted by an interface device such as a CD-ROM drive and a USB interface and may write out the output image to a non-transitory computer-readable storage medium such as a USB memory and a CD-ROM. The image outputter 103 may be constituted by a storage apparatus such as a HDD to store the output image. The image outputter 103 may be configured to serve as one of these three image output apparatuses.

The image processing apparatus 101 is constituted by a computer that includes a CPU as a controller and a processor, a RAM as a temporary memory and a keyboard as an input unit (these are not illustrated). The image processing apparatus 101 executes an image process described below according to an image processing program as an installed computer program. The image processing apparatus 101 serves as an image producer, a first processor and a second processor.

Figure 2:
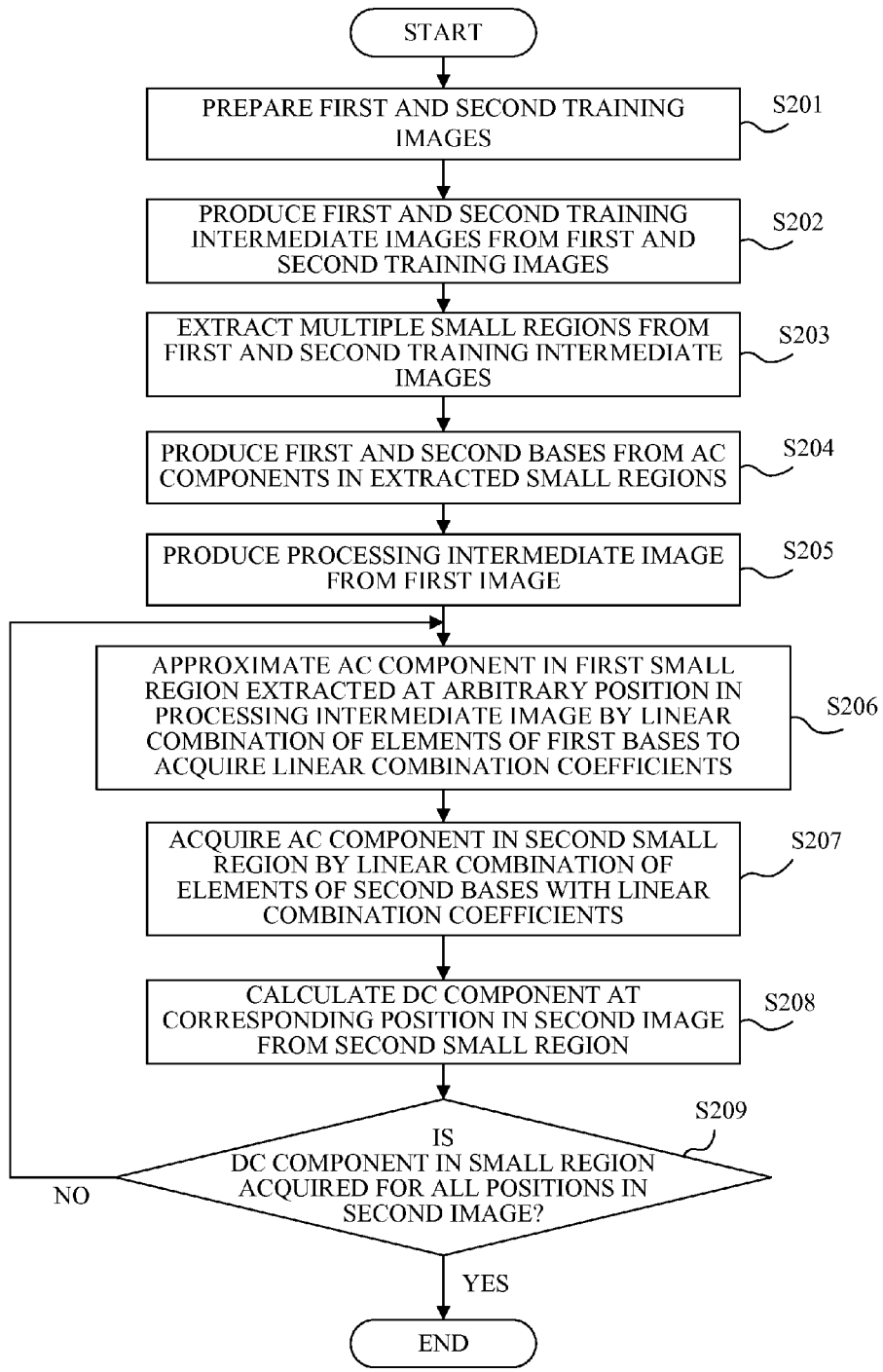
FIG. 2 is a flowchart illustrating a procedure of the image processing method in Embodiment 1.

FIG. 2 is a flowchart illustrating a procedure of an image process (image processing method) performed by the image processing apparatus 101. This image process produces, from a first image as a known input image, a second image as an unknown output image by using sparse coding. More specifically, the image process acquires a DC component as an average pixel value in a partial region (hereinafter, referred to as a small region) at an arbitrary position in the second image. In this embodiment, the first image and the second image have an identical size to each other. The size of the first and second images and that of the small region are expressed by p×q where p represents number of pixels in a vertical direction, and q represents number of pixels in a horizontal direction. Although this embodiment describes the first image as a monochrome image, processes described below may be performed for each color of, for example, RGB when the first image is a color image.

At step S201, the image processing apparatus 101 prepares (provides) a first training image and a second training image that are respectively used to produce a first basis and a second basis described later. The first training image and the second training image are respectively selected for the first image as the input image and the second image as the output image, in other words, selected as similar images thereto. For example, when a color conversion from an image stained by Hematoxylin-Eosin (HE) to an image stained by Direct Fast Scarlet (DFS) is performed, the HE stained image corresponds to the first image, and the DFS stained image corresponds to the second image. The HE stained image and the DFS stained image are pathological sample images of, among multiple sections sliced from an identical tissue, two sections sliced at adjacent positions and stained with mutually different colors. In this example, the first training image is an image of a pathological sample which is an HE stained section of an arbitrary tissue, and the second training image is an image of a pathological sample which is a DFS stained section of the tissue. The color conversion in this example is a virtual color conversion technique on a computer.

Next, at step S202, the image processing apparatus 101 produces a first training intermediate image from the first training image and produces a second training intermediate image from the second training image. The first training intermediate image is an image having a pixel value distribution in which a difference among multiple pixel values in a small region of the first training intermediate image is equal to a DC component in a small region of the first training image corresponding to the small region of the first training intermediate image. Similarly, the second training intermediate image is an image having a pixel value distribution in which a difference among multiple pixel values in a small region of the second training intermediate image is equal to a DC component in a small region of the second training image corresponding to the small region of the second training intermediate image.

This rule for producing the training intermediate image from the training image is also applied to producing a processing intermediate image from the first image which is a processing target image described later. Specifically, the processing intermediate image is produced from the first image under a rule that the processing intermediate image is an image having a pixel value distribution in which a difference among multiple pixel values in a small region of the processing intermediate image is equal to a DC component in a small region of the first image corresponding to the small region of the processing intermediate image.

The training images and the first image (processing target image) are hereinafter collectively referred to as the input image, and the training intermediate images and the processing intermediate image are hereinafter collectively referred to as the intermediate image, in detailed description below of the rule.

The term "a small region corresponding to another small region" between the input image and the intermediate image (also between other images) means that these small regions are located at an identical position (coordinates) in these images.

The "multiple pixel values in the small region" of the intermediate image may be selected as, for example, pixel values at an upper-left corner and a lower-right corner of the small region, or pixel values at a lower-left corner and an upper-right corner, or may be selected in any way. The number of the multiple pixel values is not limited to two and may be three pixel values or more. When three pixel values or more are selected, a sum of a difference between each pair of pixel values among the three pixel values or more corresponds to the "difference" stated in the rule, and this difference needs to be equal to the DC component in the corresponding region. For example, when three pixels are selected, a sum of a difference between pixel values at the upper-left corner and the lower-right corner and a difference between pixel values at the lower-left corner and the lower-right corner corresponds to the "difference" stated in the rule.

The small region needs to have a size, that is, numbers of pixels in the vertical direction and the horizontal direction, smaller than those of the input image and the intermediate image. The numbers of pixels in each of these directions needs to be two or more. The size of the small region is fixed during the production of the intermediate image from the input image.

In the following description, a rule represented by following expressions (1) and (2) is used as the rule for producing the intermediate image from the input image. First, initial pixel values in the intermediate image are all set to zero. Next, when a pixel value a at an upper-left corner in a small region at an arbitrary position in the intermediate image is confirmed to be zero, the pixel value a at the upper-left corner and a pixel value b at a lower-right corner are set as follows:

$$a = -\frac{DC}{2} + \varepsilon \quad (1)$$

$$b = \frac{DC}{2} + \varepsilon$$

where DC represents a DC component in a small region of the input image corresponding to a small region of the intermediate image, and $\varepsilon$ represents an arbitrary constant. When the pixel value a at the upper-left corner is not zero, only the pixel value b at the lower-right corner in the small region is set as follows:

$$b = DC + a \quad (2)$$

It is obvious from expressions (1) and (2) that a difference among pixel values in a small region at an arbitrary position in the intermediate image is used to calculate a DC component in a small region of an original image corresponding to the small region of the intermediate image, as follows:

$$DC = -a + b \quad (3)$$

Any rule (for example, a rule that uses a difference among three pixel values or more as described above) other than the rule represented by expressions (1) and (2) may be employed as the rule for producing the intermediate image from the input image. However, in that case, expression (3) needs to be changed according to the employed rule. This applies to other embodiments described later.

Figure 11:
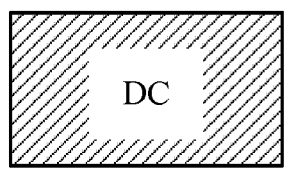
FIG. 11 illustrates a relation between an original image and an intermediate image in Embodiment 1.
Figure 11:
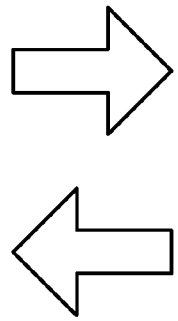
Figure 11:

FIG. 11 illustrates a relation between expressions (1) to (3) and the input and intermediate images. A hatched rectangle illustrated on a left side of FIG. 11 illustrates a DC component in a small region at a certain position in the input image. A rectangle illustrated on a right side of FIG. 11 is a small region of the intermediate image corresponding to the small region of the input image. In the small region of the intermediate image, a and b represent the pixel values at the upper-left and lower-right corners in that small region.

At step S203, the image processing apparatus 101 extracts multiple small regions from the first training intermediate image and extracts multiple small regions from the second training intermediate image respectively corresponding to (that is, at positions identical to those of) multiple small regions extracted from the first training intermediate image. The image processing apparatus 101 sets at random the positions (extraction positions) of extracting the small regions from the first training intermediate image places. Although the extracted small region can partially overlap with a previously extracted small region, two or more small regions fully overlapping with one other cannot be extracted from an identical position. Each small region has a same size as that set at step S202.

At step S204, the image processing apparatus 101 subtracts, from a pixel value distribution in each small region extracted from the first training intermediate image at step S203, a DC component in that small region to calculate an AC component therein. The image processing apparatus 101 similarly calculates an AC component in each small region extracted from the second training intermediate image. Then, the image processing apparatus 101 produces, by using these AC components, by a process called dictionary learning, a first basis for the first training intermediate image and a second basis for the second training intermediate image.

Next, description will be made of a dictionary learning algorithm for producing the first and second bases. Known dictionary learning algorithms include joint sparse coding and coupled dictionary learning, which are disclosed in Literature 2. When using the joint sparse coding, the image processing apparatus 101 first converts the AC component in the small region extracted at a certain position in the first training intermediate image into a column vector. Next, the image processing apparatus 101 converts the AC component in the small region of the second training intermediate image corresponding to the small region extracted from the first training intermediate image into a column vector. Then, the image processing apparatus 101 joints these two column vectors to produce a vertical column vector. The image processing apparatus 101 performs these processes on the AC components in all the extracted small regions and horizontally joints the produced vertical column vector to produce a matrix.

The image processing apparatus 101 further produces, from this matrix, one basis matrix by using a K-SVD algorithm. The K-SVD algorithm is an algorithm for producing a basis matrix by using a matrix produced from a training image and is used most popularly in the sparse coding. Although this embodiment employs the K-SVD algorithm in the dictionary learning using the first and second training intermediate images, any other algorithm having a similar functionality may be applicable.

Of the produced basis matrix, an upper half matrix corresponds to the first training intermediate image, and a lower half matrix corresponds to the second training intermediate image. The image processing apparatus 101 extracts the upper half matrix from the produced basis matrix, converts the column vectors in that upper half matrix into small regions and sets a set of the resulting small regions as the first basis. The image processing apparatus 101 performs the same conversion on the lower half matrix extracted from the basis matrix and sets a set of the resulting small regions as the second basis. Each small region has a same size as that of the small region set at step S202.

In the coupled dictionary learning, learning is performed by a method different from the above-described method. This embodiment uses the joint sparse coding and therefore description of the coupled dictionary learning will be omitted. Either of the joint sparse coding and the coupled dictionary learning can produce bases for achieving the same effects. The number of the small regions, which are elements of the basis, is previously set by a user.

The processes at steps S201 to S204 do not necessarily need to be performed by the image processing apparatus 101. That is, the user may previously produce the first and second bases using another computer and store these bases in the image processing apparatus 101. In this case, the image processing apparatus 101 may use the first and second bases thus stored when performing processes at step S205 and subsequent steps.

Next, at step S205, the image processing apparatus 101 produces the processing intermediate image from the first image under the rule described in step S202. The first and second training intermediate images produced from the first and second training images at step S202 are used to produce the first and second bases at step S204. On the other hand, the processing intermediate image produced from the first image input as the processing target image at this step is used to calculate a DC component in a small region at an arbitrary position in the second image as the output image. That is, the image processing apparatus 101 performs image processing on the processing intermediate image by using the first and second bases calculated at steps S201 to S204 to acquire the DC component in the small region at the arbitrary position in the second image as the output image.

Next, at step S206, the image processing apparatus 101 extracts a first small region (first partial region) at an arbitrary position in the processing intermediate image and approximates an AC component in the first small region with a linear combination of the elements of the first basis to acquire linear combination coefficients. The approximation with the linear combination (hereinafter also referred to as "linear combination approximation") means that expressing the AC component in the extracted first small region by a weighted sum of small regions that are the elements of the first basis, and weights of the small regions are the linear combination coefficients. Each small region has a same size as that set at step S202. The linear combination approximation can be represented by following expression (4):

$$t \approx \alpha_1 s_1 + \alpha_2 s_2 + \ldots \alpha_n s_n \quad (4)$$

where si (i=1 to n) represents the elements of the first basis, αi (i=1 to n) represents a weight for an i-th element of the first basis, that is, a linear combination coefficient. Moreover, t represents the AC component in the first small region extracted from the processing intermediate image, and n represents number of all the elements of the first basis. Algorithms of approximating a small region extracted from an image with a linear combination of elements of a basis include orthogonal matching pursuit (OMP) disclosed in Literature 1. Although this embodiment uses the OMP to approximate the extracted small region with the linear combination of the element of the basis, any other algorithm having a similar functionality may be applicable.

At step S207, the image processing apparatus 101 acquires (estimates), by a linear combination of the elements of the second basis with the linear combination coefficients acquired at step S206, an AC component in a second small region (second partial region). On an assumption that the second image as the output image is produced, an intermediate image that is expected to be produced from that second image under the rule described at step S202 is referred to as "a virtual intermediate image". The second small region at this step is a small region as a virtual region of the virtual intermediate image corresponding to the first small region extracted from the processing intermediate image at step S206. The process at this step is a first process.

Next, at step S208, the image processing apparatus 101 acquires, by using the AC component in the above-mentioned second small region, a DC component in a small region of the second image corresponding to the second small region, that is, corresponding to the first small region extracted from the processing intermediate image. In order to acquire the DC component in the small region of the second image corresponding to the second small region by using the AC component in the second small region, the image processing apparatus 101 uses a reverse procedure to that for producing the intermediate image from the input image described at step S202. In other words, the image processing apparatus 101 calculates a difference between the pixel values at the upper-left corner and the lower-right corner in the second small region to acquire the DC component in the small region of the second image corresponding to the second small region. The process at this step is a second process.

When any rule other than expressions (1) and (2) is used for producing the intermediate image from the input image, the method of acquiring the DC component in the small region of the second image corresponding to the second small region from the AC component in that second small region needs to be changed according to the rule to be used.

Next, description will be made of grounds for enabling the acquisition of the DC component in the small region of the second image corresponding to the second small region from a difference among multiple pixel values in the second small region. As described at step S207, the AC component in the second small region is the AC component estimated in the small region of the virtual intermediate image for the second image. As shown by expression (3), using the difference between the pixel values at the upper-left corner and the lower-right corner in a small region (hereinafter, referred to as "an intermediate small region") at an arbitrary position in the intermediate image enables providing a DC component in a small region of the input image corresponding to the intermediate small region. The pixel values at the upper-left corner and the lower-right corner in the intermediate small region are sums of a common DC component and different AC components from each other. Thus, the difference between both the pixel values is a difference between the AC components, and this difference is the DC component in the small region of the second image corresponding to the intermediate small region. This is expressed by following expression (5):

$$DC = -a + b \quad (5)$$
$$= -(\tilde{a} + m) + (\tilde{b} + m)$$
$$= -\tilde{a} + \tilde{b}$$

where a and b represent the pixel values at the upper-left corner and the lower-right corner (sums of the DC component and the AC component thereat) in a small region (referred to as "an intermediate small region") in the intermediate image, m represents the DC component in the intermediate small region, and a and b with "~" respectively represent values of the AC components at an upper-left corner and a lower-right corner in the intermediate small region. Moreover, DC represents the DC component in the small region of the second image corresponding to the intermediate small region.

The image processing apparatus 101 thus acquiring the DC component in one small region of the second image proceeds to step S209.

At step S209, the image processing apparatus 101 repeats, until the DC components in the small regions at all different positions in the second image are acquired, the processes at steps S206 to S208 with changing the position of extracting the first small region at step S206. In the case of allowing the extraction of the partially overlapped small regions from the processing intermediate image at step S206, that extraction may also cause overlap in a finally acquired DC component in a small region at a certain position in the second image. In that case, at the position where the overlap in the DC component in the small region of the second image is caused, the image processing apparatus 101 adds together the overlapped DC components and divides the addition result by number of the overlapped DC components at each pixel to acquire the DC components in the small regions at all positions in the second image. When the acquisition of the DC components in all the small regions in the second image completes, the image processing apparatus 101 completes the production of the second image and thus ends the process.

Although the described process at step S209 acquires the DC components in the small regions at the all positions in the second image, the DC components in the small regions at the all positions are not necessarily needed to be acquired. That is, only the DC components in small regions (partial region of the second image) at multiple positions depending on an intended use of the second image may be acquired.

The procedure described above enables acquiring, from the known first image, the DC component in the small region at any arbitrary position in the unknown second image or in a partial region thereof.

Next, description will be made of application examples of the image processing described in Embodiment 1.

Embodiment 2

Description will be made of an image processing method of performing a color conversion from a known first image to an unknown second image, which is a second embodiment (Embodiment 2) of the present invention, with reference to a flowchart in FIG. 3. In this embodiment, the first image and the second image have an identical size to each other. The first image is an input image (processing target image), and the second image is an output image. Although this embodiment also describes the case where the first image is a monochrome image, when the first image is a color image in a color space such as RGB, YCbCr and HSV, the following processes may be performed thereon for each color the first image is a color image of a color space such as RGB, YCbCr and HSV, as described in Embodiment 1.

Figure 3:
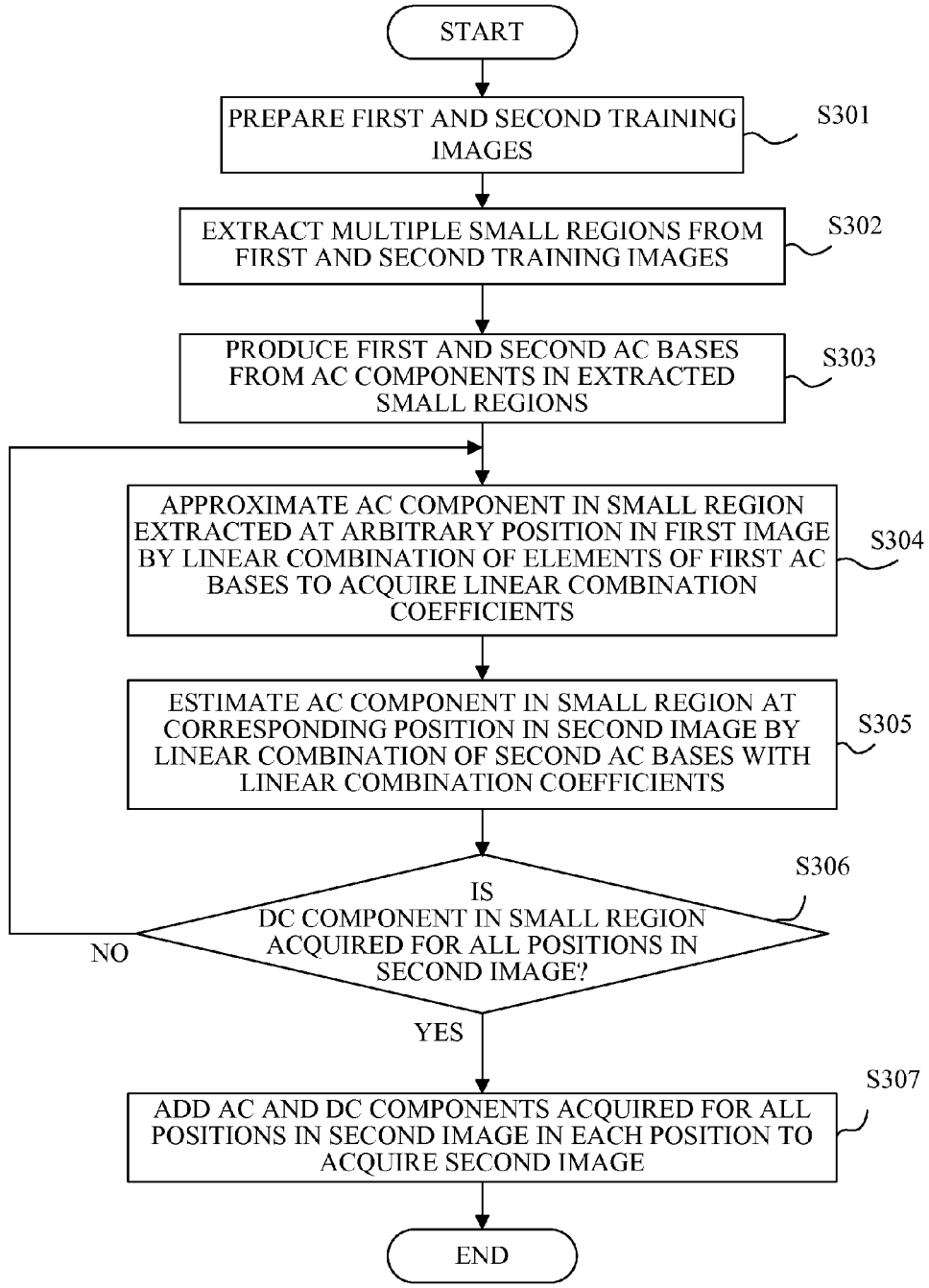
FIG. 3 is a flowchart of Embodiment 2 as an application example of the image processing method in Embodiment 1.

The flowchart in FIG. 3 illustrates a procedure of a color conversion process (image processing method) performed by the image processing apparatus 101. The image processing apparatus 101 as a computer executes the color conversion process described below according to a color conversion program (image processing program) as an installed computer program.

At step S301, the image processing apparatus 101 prepares (provides) first and second training images. These training images are prepared in a same manner as that described at step S201 of Embodiment 1 (FIG. 3).

Next, at step S302, the image processing apparatus 101 extracts multiple small regions from the first training image. Moreover, the image processing apparatus 101 extracts, from the second training image, multiple small regions corresponding to the multiple small regions (that is, located at identical positions) of the first training image. Each small region has a size smaller than that of the first and second images and has each side of two pixels or more. In this embodiment, the size of the small region is 8×9 pixels. The small region is extracted under a same rule as that described at step S203 in Embodiment 1.

Next, at step S303, the image processing apparatus 101 produces, by using the method described at step S204 in Embodiment 1, from AC components in the small regions extracted at step S302, a first AC component basis and a second AC component basis which are used for acquiring AC components in the second image. The first and second AC component bases are hereinafter respectively abbreviated as a first AC basis and a second AC basis. Numbers of elements of the first and second AC basis are desirable to be large. However, a larger number of the elements needs a longer calculation time for producing the first and second AC bases. For this reason, in this embodiment, the numbers of the elements of the first and second AC bases are each set to 1024.

The processes at steps S301 to S303 do not necessarily need to be performed by the image processing apparatus 101. That is, a user may previously produce the first and second bases using another computer and store these bases in the image processing apparatus 101. In this case, the image processing apparatus 101 may use the first and second bases thus stored when performing processes at step S304 and subsequent steps.

At step S304, the image processing apparatus 101 extracts a small region at an arbitrary position in the first image and approximates an AC component in the extracted small region with a linear combination of the elements of the first AC basis to acquire linear combination coefficients. The linear combination approximation is performed as described at step S206 in Embodiment 1. The extracted small region has a same size as that set at step S302.

Next, at step S305, the image processing apparatus 101 estimates, by a linear combination of the elements of the second AC basis with the linear combination coefficients acquired at step S304, an AC component in a small region of the second image corresponding to the small region extracted from the first image. The processes at steps S304 and S305 correspond to a third process.

Next, at step S306, the image processing apparatus 101 repeats, until the AC components in the small regions at all different positions in the second image are acquired, the processes at steps S304 and S305 with changing the position of extracting the small region at step S304. After acquiring the AC components in the small regions at all the positions in the second image, the image processing apparatus 101 proceeds to step S307.

At step S307, the image processing apparatus 101 adds together the AC component in each of the small regions of the second image acquired at steps S301 to S306 and the DC components in same each small region acquired at steps S201 to S209 described in Embodiment 1 to produces the second image. When the DC component in the small region is acquired as described at steps S201 to S209, the size of the small region is set to the size in this embodiment at step S202. In addition, in a case where partial overlap of the small regions extracted from the first image is allowed at step S304, the same process as that described at step S209 in Embodiment 1 is performed.

The procedure described above enables performing the color conversion from the known first image to the unknown second image.

Figure 6A:
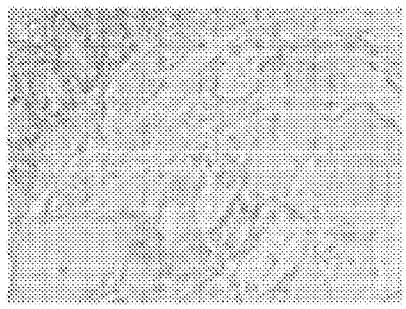
FIGS. 6A to 6E illustrate a result of Embodiment 2.
Figure 6D:
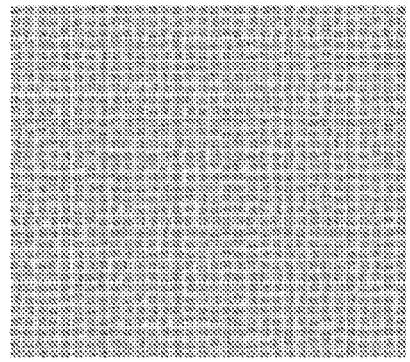
Figure 6B:
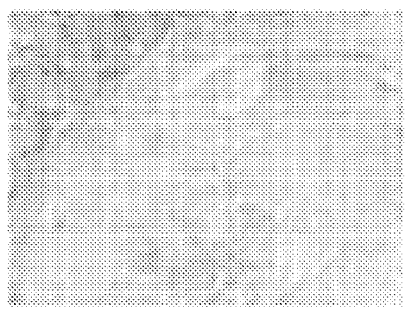
Figure 6E:
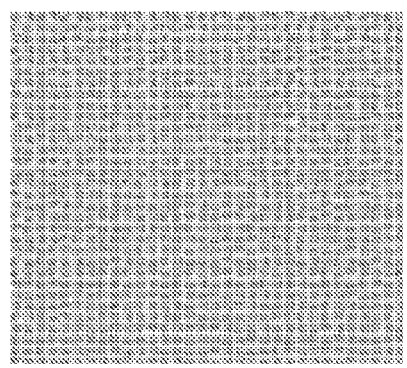
Figure 6C:

Description will be made of an example of a color conversion from the HE stained image (first image) to the DFS stained image (second image) through the color conversion process in this embodiment. FIG. 6A illustrates the HE stained image. FIG. 6B illustrates the DFS stained image acquired from the HE stained image by the color conversion. FIG. 6C illustrates a ground truth DFS stained image. FIGS. 6D and 6E respectively illustrate the first basis and the second basis.

All the images are normalized such that a sum of squares of pixel values in each image becomes 1. Each of all the images has a size of 120×160 pixels. FIGS. 6D and 6E illustrate the first and second bases in each of which 32 elements each including 8×9 pixels are tiled in each of vertical and horizontal directions.

Evaluation of a similarity between the ground truth DFS stained image and the DFS stained image acquired from the HE stained image by using root mean square error (RMSE) resulted in an RMSE of 6.6528E-4. The RMSE is a square root of a value obtained by dividing a sum of squares of a difference of pixel values between an evaluation target image and a reference image by number of pixels in the reference image. The evaluation target image and the reference image have an identical size to each other. In this embodiment, the reference image is the ground truth DFS stained image, and the evaluation target image is the acquired DFS stained image. Simply put, a smaller RMSE indicates a higher similarity of the acquired DFS stained image to the ground truth DFS stained image.

Next, description will be made of, in order to show superiority of the image process of this embodiment to conventional image processes, an example of a color conversion from the HE stained image to the DFS stained image by using a combination of a method called "integral image" and the sparse coding. Although the integral image and the sparse coding are each well known by itself, their combination has not been reported.

A simple combination of these methods would hardly acquire an accurate DC component for a reason described later. This simple combination of these methods is referred to as "a simple conventional method combination" to be distinguished from the image processing method of this embodiment. The integral image is a method of producing an intermediate image from an input image under a rule represented by following expression (6):

$$I(x,y)=i(x,y)+I(x-1,y)+I(x,y-1)-I(x-1,y-1) \qquad (6)$$

where i(x, y) represents a pixel value at coordinates (x, y) of the input image, and I(x, y) represents a pixel value at coordinates (x, y) of the intermediate image. As a specific method of applying the rule represented by expression (6), scanning of the coordinates (x, y) is performed in the intermediate image from a pixel at an upper-left corner toward a right direction in a pixel line to sequentially output I(x, y) calculated by expression (6). When the scanning reaches a rightmost pixel of the pixel line, the scanning is repeated from a leftmost pixel to a rightmost pixel in a pixel line lower by one pixel than the scanned pixel line. This method produces the intermediate image from the input image. In the specific method, initial pixel values of the intermediate image are all zero. The input image and the intermediate image have an identical size to each other. When expression (6) needs information of pixel values such as I(0, 1) and I(1, 0) outside the intermediate image, those pixel values are set to zero.

The intermediate image thus produced enables acquiring, from pixel values at four corners of a small region (intermediate small region) at an arbitrary position in the intermediate image, a sum of pixel values in a small region of the input image corresponding to the intermediate small region by following expression (7):

$$V = I1 + I4 - (I2 + I3) \quad (7)$$

where I1, I2, I3 and I4 represent the pixel values at the four corners (that is, pixel values at the upper-left corner, the upper-right corner, the lower-left corner and the lower-right corner) of the intermediate small region at the arbitrary position. In addition, V represents the sum of the pixel values in the small region of the input image corresponding to the intermediate small region.

However, as a characteristic of the integral image, a correct sum of the pixel values in the small region (hereinafter also referred to as "a corresponding small image") of the input image corresponding to the intermediate small region is not always acquired. To be precise, the sum V calculated by expression (7) is a sum of pixel values in a small region other than first row and first column pixels of the corresponding small region of the input image. Thus, using the sum V of the pixel values calculated by expression (7) does not enable providing a correct DC component in the corresponding small region of the input image. However, this embodiment uses, in order to use the integral image, as the DC component in the corresponding small region of the input image, a value given by following expression (8):

$$DC = \frac{V}{N} \quad (8)$$

where V represents the sum of the pixel values in the corresponding small region of the input image which is calculated by expression (7), and DC represents the DC component in the corresponding small region of the input image. In addition, N represents number of pixels other than the first row and first column pixels of the corresponding small region of the input image.

Figure 7A:
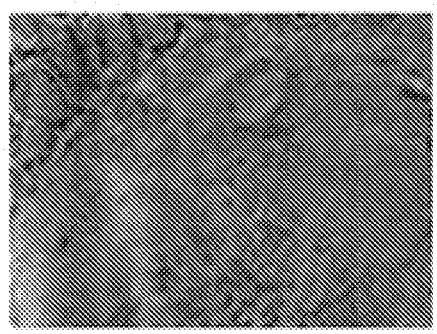
FIGS. 7A to 7C illustrate results obtained through a simple conventional method combination.
Figure 7B:
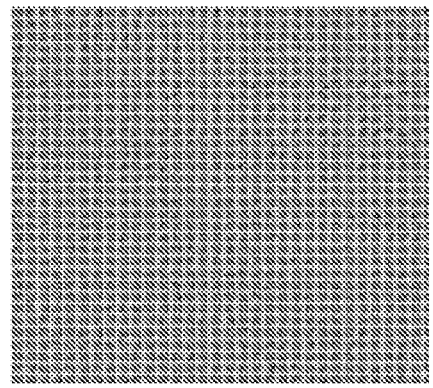
Figure 7C:
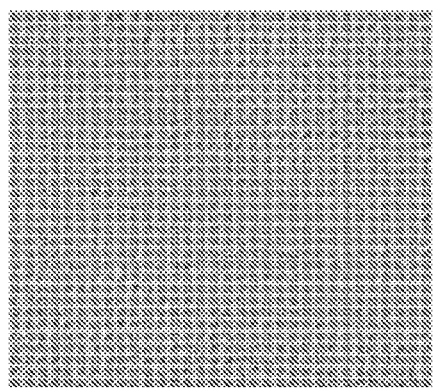

FIGS. 7A to 7C illustrate an example in which this integral image was used at step S202 for performing the color conversion from the HE stained image to the DFS stained image by the simple conventional method combination.

This embodiment produces the intermediate image from the input image under the rule represented by expressions (1) and (2), whereas the simple conventional method combination produced the intermediate image from the input image under the rule represented by expression (6). Since the intermediate image is produced from the input image under the different rules from each other, the method of calculating the DC component in the small region of the second image corresponding to the second small region from the AC component in the second small region at step S208 is different between in this embodiment and in the simple conventional method combination. Accordingly, this embodiment uses the rule represented by expression (3), whereas the simple conventional method combination used the rule represented by expressions (7) and (8).

The processes at other steps S201, S203 to S207, S209 and S301 to S307 were performed similarly to this embodiment, and thereby the color conversion from the HE stained image to the DFS stained image was performed by the simple conventional method combination.

FIG. 7A illustrates the DFS stained image acquired from the HE stained image by the color conversion with the simple conventional method combination. FIGS. 7B and 7C respectively illustrate a first basis and a second basis produced by the simple conventional method combination. The acquired DFS stained image is normalized such that a sum of squares of pixel values becomes 1. The acquired DFS stained image has a size of 120×160 pixels. FIGS. 7B and 7C illustrate the first and second bases in each of which 32 elements each including 8×9 pixels are tiled in each of vertical and horizontal directions.

Evaluation of the similarity between the ground truth DFS stained image illustrated in FIG. 6C and the DFS stained image acquired by the simple conventional method combination resulted in an RMSE of 1.4603E-3. This proves that the DFS stained image acquired in this embodiment (its RMSE is 6.6528E-4) is more similar to the ground truth DFS stained image than that acquired by the simple conventional method combination (its RMSE is 1.4603E-3). This is because this embodiment and the simple conventional method combination use mutually different rules for producing the intermediate image from the input image. Although the simple conventional method combination uses the conventional rule represented by expression (6), this embodiment uses the rule represented by expressions (1) and (2) which is a unique rule to this embodiment. As described above, as the characteristic of the integral image, using expression (7) cannot provide a correct DC component in the corresponding small region of the input image. In contrast, this embodiment employing expression (3) enables providing an accurate DC component in the corresponding small region of the input image. That is, this embodiment can provide a more accurate solution than that of the simple conventional method combination. Since the produced intermediate images are different between in this embodiment and in the simple conventional method combination, the bases produced by the dictionary learning using the intermediate image (training intermediate image) are also different between in them.

Embodiment 3

In a third embodiment (Embodiment 3) of the present invention, description will be made a method of calculating, from a sample image acquired by image capturing of an unknown sample through a partially coherent or completely coherent imaging system, a complex amplitude distribution of light transmitted through the sample, with reference to a flowchart illustrated in FIG. 4. The sample image corresponds to the first image (input image) in Embodiment 1, and an image having the complex amplitude distribution corresponds to the second image (output image). To be precise, the complex amplitude distribution of the light transmitted through the sample means phase and amplitude distributions of an electric field of the light transmitted through the sample. The complex amplitude distribution of the light transmitted through the sample is hereinafter simply referred to as "a complex amplitude distribution of the sample".

An image showing the complex amplitude distribution of the sample is constituted by an image of a real part (hereinafter also referred to as "a real-part image") and an image of an imaginary part (hereinafter also referred to as "an imaginary-part image"). The sample image, the real-part image and the imaginary-part image have an identical size to one another. The imaginary-part image is two-dimensionally arranged data of real numbers except an imaginary unit i.

The partially coherent imaging system means an imaging optical system in which lights transmitted through two arbitrary points of the sample interfere with each other depending on their phases and illumination conditions, such as a bright field microscope. The completely coherent imaging system means an imaging optical system in which lights transmitted through two arbitrary points of the sample interfere with each other depending only on their phases, which is achieved by, for example, illumination with laser light.

Although this embodiment describes the first image as a monochrome image, as described in Embodiment 1, when the first image is a color image of a color space such as RGB, YCbCr and HSV, the following processes may be performed for each color.

Figure 4:
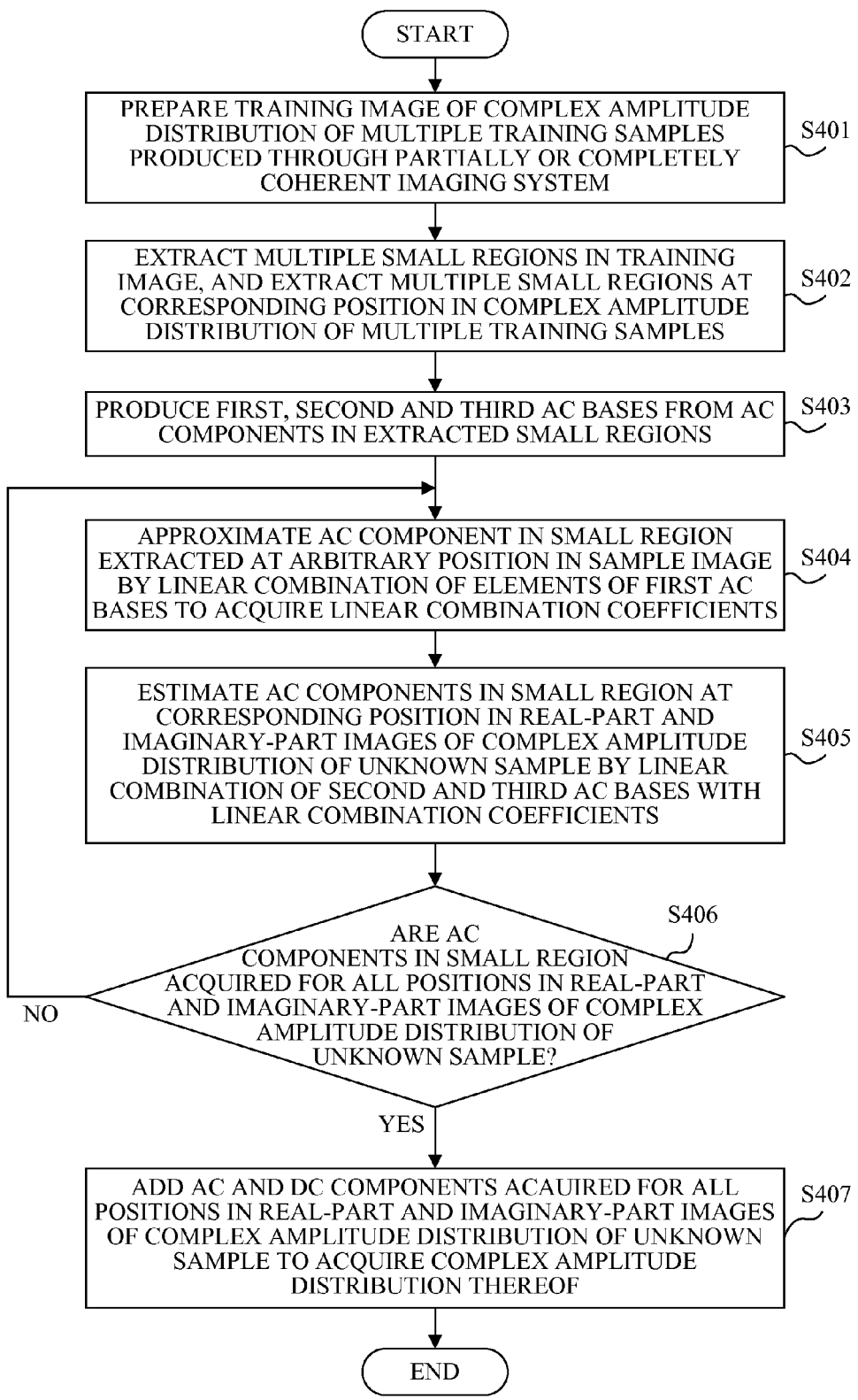
FIG. 4 is a flowchart of Embodiment 3 as another application example of the image processing method in Embodiment 1.

The flowchart in FIG. 4 illustrates a procedure of a sample image process (image processing method) performed by the image processing apparatus 101. The image processing apparatus 101 executes the sample image process described below according to a sample image processing program as an installed computer program.

At step S401, the image processing apparatus 101 provides (prepares) a real-part image and an imaginary-part image that show a complex amplitude distribution of a training sample and provides a training image acquired by image capturing of the training sample through the partially coherent or completely coherent imaging system. The complex amplitude distribution of the training sample can be modeled, when the sample is, for example, a section of a tissue obtained from a patient, by using known refractive indices of constituent elements (such as a nucleus and a cell cytoplasm) of a cell. The complex amplitude distribution may be acquired by using data obtained through a digital holography microscope or the like. When using the former, the image processing apparatus 101 produces the training image by image capturing simulation. When using the latter, the image processing apparatus 101 produces the training image by the image capturing simulation or an actual image capturing through the microscope.

Next, at step S402, the image processing apparatus 101 extracts multiple small regions from the training image. Moreover, the image processing apparatus 101 also extracts, from each of the real-part and imaginary-part images of the complex amplitude distribution of the training sample, multiple small regions at corresponding positions to those of the small regions extracted from the training image. Each small region needs to have a size smaller than that of the sample image and to have each side of two pixels or more. In this embodiment, the size of the small region is 6×8 pixels. The small region is extracted under the same rule as that described at step S203 in Embodiment 1.

Next, at step S403, the image processing apparatus 101 produces, by using the method described at step S204, from AC components in the small regions extracted at step S402 from the training image, the real-part image and the imaginary-part image, a first AC component basis, a second AC component basis and a third AC component basis (hereinafter respectively referred to as "a first AC basis", "a second AC basis" and "a third AC basis"). Although the description of step S204 was made of the method of extracting the small regions from two images and performing dictionary learning on the AC components in the extracted small regions to produce two bases, the method is also applicable to this case of three images.

Next, description will be made of a method of producing the first, second and third AC bases. The image processing apparatus 101 first extracts a small region at a certain position in the training image. Similarly, the image processing apparatus 101 extracts, from each of the real-part and imaginary-part images of the complex amplitude distribution of the training sample, a small region corresponding to the small region extracted from the training image. Then, the image processing apparatus 101 converts these three extracted small regions into column vectors and vertically joints these three column vectors to produce a long column vector. The image processing apparatus 101 repeats this process on all the small regions extracted from the training image and from the real-part and imaginary-part images of the complex amplitude distribution of the training sample to produce a matrix in which the long column vectors are horizontally jointed.

The image processing apparatus 101 then produces one basis matrix from the produced matrix by the K-SVD algorithm. Of the produced basis matrix, a top third part corresponds to the training image, a bottom third part corresponds to the imaginary-part image of the training sample, and a middle third part corresponds to the real-part image of the training sample. The image processing apparatus 101 then extracts, from the basis matrix, the parts respectively corresponding to the training image, the real-part image and the imaginary-part image and converts the column vectors of each of the extracted parts into small regions. Sets of these small regions converted from the training, real-part and imaginary-part images are respectively set as the first, second and third AC bases. For the same reason as that described in Embodiment 2, number of elements of each of the first, second and third AC bases is set to 1024.

The processes at steps S401 to S403 do not necessarily need to be performed by the image processing apparatus 101. That is, a user may previously produce the first to third bases using another computer and store these bases in the image processing apparatus 101. In this case, the image processing apparatus 101 may use the first to third bases thus stored when performing processes at step S404 and subsequent steps.

Next, at step S404, the image processing apparatus 101 extracts a small region at an arbitrary position in the sample image and approximates an AC component in the extracted small region (hereinafter, referred to as the sample image small region) with a linear combination of the elements of the first AC basis to acquire linear combination coefficients. The linear combination approximation is performed as described at step S206 in Embodiment 1. The sample image small region has a same size as that set at step S402.

Next, at step S405, the image processing apparatus 101 estimates, by a linear combination of the elements of the second AC basis with the linear combination coefficients acquired at step S404, an AC component in a small region of the real-part image (of the complex amplitude distribution of the unknown sample) corresponding to the sample image small region. Similarly, the image processing apparatus 101 estimates, by a linear combination of the elements of the third AC basis with the linear combination coefficients acquired at step S404, an AC component in a small region of the imaginary-part image (of the complex amplitude distribution of the unknown sample) corresponding to the sample image small region. The processes at steps S404 and S405 are a third process.

Next, at step S406, the image processing apparatus 101 repeats, until the AC components in the small regions at all different positions in each of the real-part and imaginary-part images of the complex amplitude distribution of the sample are acquired, the processes at steps S404 and S405 with changing the position of extracting the sample image small region at step S404. After acquiring the AC components in the small regions at all the positions in the real-part and imaginary-part images, the image processing apparatus 101 proceeds to step S407.

At step S407, the image processing apparatus 101 adds together, at each of all the positions in the real-part image of the complex amplitude distribution of the unknown sample, the AC components in the small region acquired at steps S404 to S406 and the DC component therein acquired at steps S201 to S209 described in Embodiment 1. This process provides the real-part image of the complex amplitude distribution of the sample. Moreover, the image processing apparatus 101 acquires, in a similar manner, the imaginary-part image of the complex amplitude distribution of the sample.

In addition, in a case where partial overlap of the small regions extracted from the sample image is allowed at S404, the same process as that described at step S209 in Embodiment 1 is performed.

The procedure described above enables acquiring the complex amplitude distribution of the unknown sample from the sample image.

Figure 5:
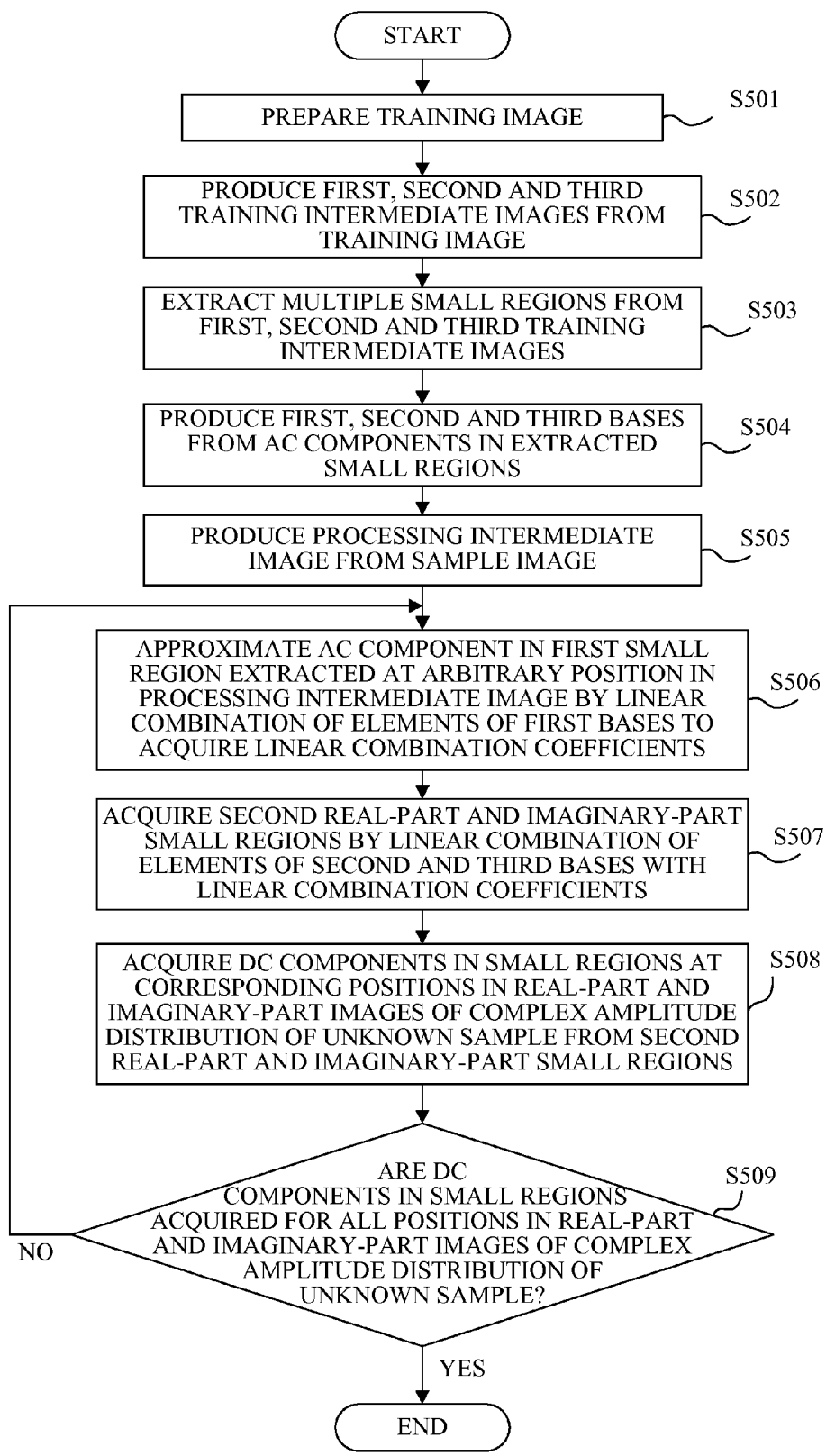
FIG. 5 is a flowchart illustrating a procedure of a complementary explanation of Embodiment 3.

Next, description will be made of acquiring at step S407, from the sample image, by using the processes at steps S201 to S209, the DC component in a small region at an arbitrary position in the complex amplitude distribution of the sample, with reference to a flowchart in FIG. 5.

At step S501, the image processing apparatus 101 prepares (provides) training images. As the prepared training images, the real-part and imaginary-part images of the complex amplitude distribution of the training sample and the training image which are prepared at step S401 can be used.

Next, at step S502, the image processing apparatus 101 produces, by the method described at step S202, a first training intermediate image from the training image. Similarly, the image processing apparatus 101 produces a second training intermediate image from the real-part image of the complex amplitude distribution of the training sample and produces a third training intermediate image from the imaginary-part image of the complex amplitude distribution of the training sample.

Next, at step S503, the image processing apparatus 101 extracts, by the method described at step S203, multiple small regions from the first training intermediate image. The image processing apparatus 101 also extracts, from each of the second and third training intermediate images, multiple small regions corresponding to the small regions extracted from the first training intermediate image. The extracted small regions have a same size as that set at step S402.

Next, at step S504, the image processing apparatus 101 produces, by the method described at step S403, a first basis, a second basis and a third basis from AC components in the small regions extracted at step S503.

The processes at steps S501 to S504 do not necessarily need to be performed by the image processing apparatus 101. That is, a user may previously produce the first to third bases using another computer and store these bases in the image processing apparatus 101. In this case, the image processing apparatus 101 may use the first to third bases thus stored when performing processes at step S505 and subsequent steps.

Next, at step S505, the image processing apparatus 101 produces, by the method described at step S202, a processing intermediate image from the sample image.

Next, at step S506, the image processing apparatus 101 extracts a first small region at an arbitrary position in the processing intermediate image and approximates an AC component in the extracted first small region with a linear combination of elements of the first basis to acquire linear combination coefficients. The linear combination approximation is performed as described at step S206 in Embodiment 1. The extracted small region has a same size as that set at step S503.

Next, at step S507, the image processing apparatus 101 estimates, by a linear combination of elements of the second basis with the linear combination coefficients acquired at step S506, an AC component in a second real-part small region described below. On an assumption that the real-part image of the complex amplitude distribution of the sample as an output image is produced, an intermediate image that is expected to be produced from that real-part image under the rule described at step S202 in Embodiment 1 is referred to as "a virtual real-part intermediate image". The second real-part small region used in this step is a small region as a virtual region of this virtual real-part intermediate image corresponding to the first small region of the processing intermediate image extracted at step S506.

Moreover, the image processing apparatus 101 estimates, by a linear combination of elements of the third basis with the linear combination coefficients acquired at step S506, an AC component in a second imaginary-part small region described below. On an assumption that the imaginary-part image of the complex amplitude distribution of the sample as an output image is produced, an intermediate image that is expected to be produced from that imaginary-part image under the rule described at step S202 in Embodiment 1 is referred to as "a virtual imaginary-part intermediate image". The second imaginary-part small region used in this step is a small region as a virtual region of this virtual imaginary-part intermediate image corresponding to the first small region of the processing intermediate image extracted at step S506. The process at this step is a first process.

Next, at step S508, the image processing apparatus 101 acquires, from the second real-part small region, a DC component in a small region of the real-part image (of the complex amplitude distribution of the sample) corresponding to the second real-part small region. The DC component is acquired by a same method as that described at step S208 in Embodiment 1. Furthermore, the image processing apparatus 101 similarly acquires, from the second imaginary-part small region, a DC component in a small region of the imaginary-part image (of the complex amplitude distribution of the sample) corresponding to the second imaginary-part small region. The process at this step is a second process.

Next, at step S509, the image processing apparatus 101 repeats, until the DC components in the small regions at all different positions in each of the real-part and imaginary-part images of the complex amplitude distribution of the sample are acquired, the processes at steps S506 to S508 with changing the position of extracting the first small regions at step S506. In a case where partial overlap of the small regions extracted from the processing intermediate image is allowed at step S506, the same process as that described at step S209 in Embodiment 1 is performed.

The procedure described above enables acquiring, from the sample image, the DC component in the small region at any arbitrary position in each of the real-part and imaginary-part images of the complex amplitude distribution of the unknown sample.

Figure 8A:
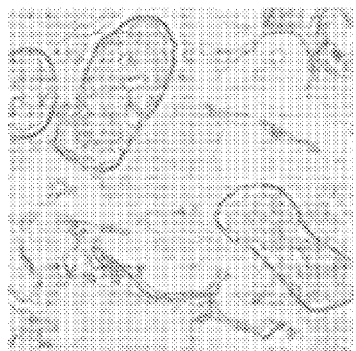
FIGS. 8A to 8E illustrate a result of Embodiment 2.
Figure 8D:
Figure 8B:
Figure 8E:
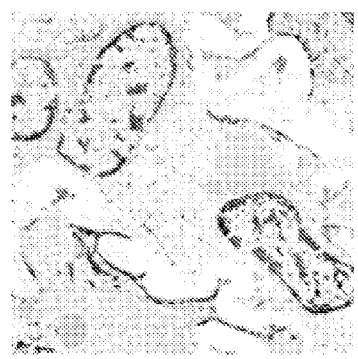
Figure 8C:
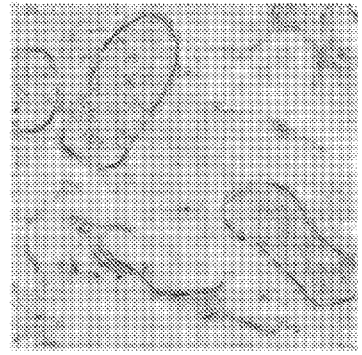

FIGS. 8A to 8E and 9A to 9C illustrate an example of acquisition of the complex amplitude distribution of the unknown sample from the sample image produced by image capturing of the sample through the partially coherent imaging system. FIG. 8A illustrates the sample image acquired by capturing of an optical image of the unknown sample formed by the partially coherent imaging system. FIG. 8B illustrates the real-part image of the complex amplitude distribution of the sample acquired from the sample image by the method described in this embodiment. FIG. 8C illustrates the imaginary-part image of the complex amplitude distribution of the sample acquired from the sample image by the method described in this embodiment. FIG. 8D illustrates a ground truth real-part image of a complex amplitude distribution of the sample. FIG. 8E illustrates a ground truth imaginary-part image of the complex amplitude distribution of the sample.

Figure 9A:
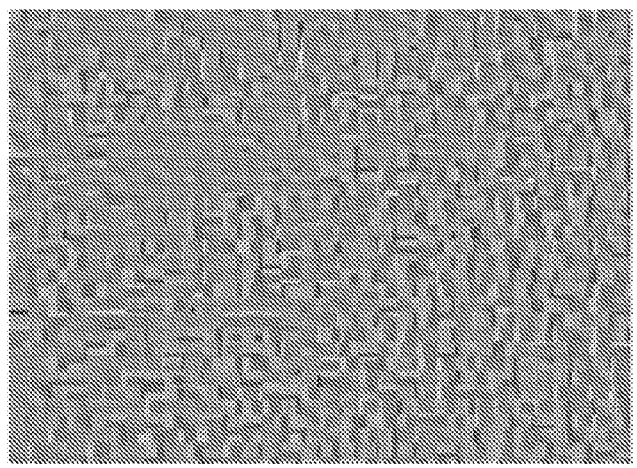
FIGS. 9A to 9C illustrate a result of Embodiment 2.
Figure 9B:
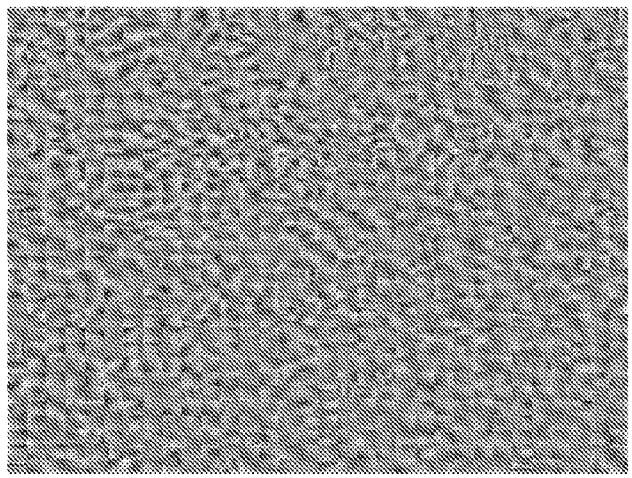
Figure 9C:
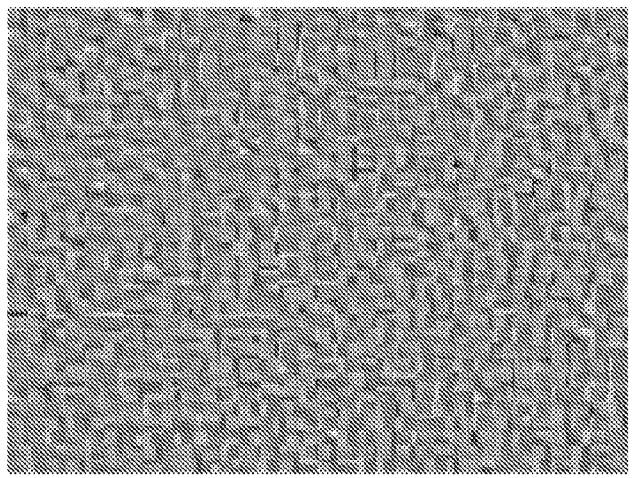

FIG. 9A illustrates the first basis, FIG. 9B illustrates the second basis, and FIG. 9C illustrates the third basis.

All the images are normalized such that a sum of squares of pixel values in each image becomes 1. The partially coherent imaging system used to acquire the sample image has the following optical conditions. An object-side numerical aperture of an imaging lens is 0.7, an inner σ of an annular light source is 0.3, an outer σ thereof is 0.7, and a wavelength of illumination light is 0.55 μm. Symbol σ represents a ratio of a numerical aperture of an illumination optical system and the object-side numerical aperture of the imaging lens. In this example, with a maximum optical path length difference generated when the illumination light is transmitted through the sample being assumed to be 2.88 radian, the complex amplitude distribution of the sample was produced through simulation. This is equivalent to modeling of a cell with a maximum refractive index difference of 0.05 between a nucleus and a cell cytoplasm. These values are exemplary used in this embodiment, and other values may be used. All images have a size of 200×200 pixels.

FIGS. 9A to 9C illustrate the first, second and third bases in each of which 32 elements each including 6×8 pixels are tiled in each of vertical and horizontal directions.

Table 1 collectively shows results of evaluation of similarities with RMSE between the real-part image and the imaginary-part image of the complex amplitude distribution of the sample acquired from the sample image and the ground truth real-part image and the imaginary-part image of the complex amplitude distribution of the sample.

Next, similarly to Embodiment 2, in order to show superiority of this embodiment, description will be made of an example of acquisition of a complex amplitude distribution of an unknown sample acquired from a sample image produced using the partially coherent imaging system, by the above-described simple conventional method combination in which the integral image and the sparse coding are combined. First, the integral image was used at step S502, and thereby the complex amplitude distribution of the unknown sample from the sample image was acquired by the simple conventional method combination. In other words, instead of the rule represented by expressions (1) and (2) used in this embodiment, the rule represented by expression (6) described in Embodiment 2 was used to produce the intermediate image from the input image. In the simple conventional method combination, since the intermediate image is produced from the input image by using the different rule from that in this embodiment as described above, the DC component is acquired from the AC component in the second small region at step S508 by a different method from that in this embodiment. Accordingly, instead of the method represented by expression (3) used in this embodiment, the method represented by expressions (7) and (8) described in Embodiment 2 was used.

The processes at other steps S501, S503 to S507, S509 and S401 to S407 were performed similarly to this embodiment, and thereby the complex amplitude distribution of the sample was acquired from the sample image by the simple conventional method combination.

Figure 10A:
FIGS. 10A to 10E illustrate a result obtained through the simple conventional method combination.
Figure 10D:
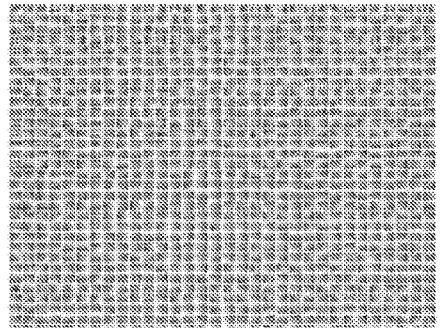
Figure 10B:
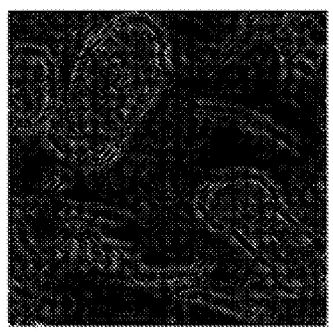
Figure 10E:
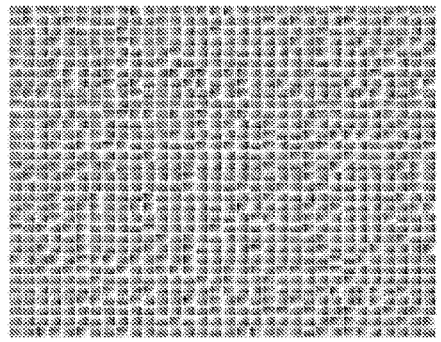
Figure 10C:
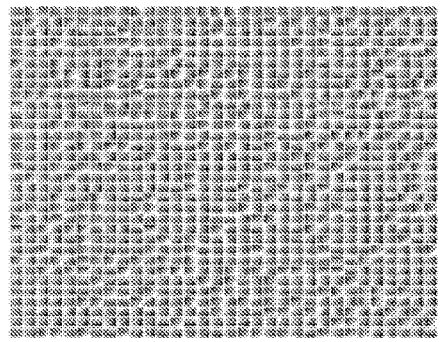

FIGS. 10A to 10E illustrate an example of acquisition of the complex amplitude distribution of the unknown sample acquired from the sample image by the simple conventional method combination. FIG. 10A illustrates a real-part image of the complex amplitude distribution of the sample acquired from the sample image by the simple conventional method combination. FIG. 10B illustrates an imaginary-part image of the complex amplitude distribution of the sample acquired from the sample image by the simple conventional method combination. FIGS. 10C, 10D and 10E respectively illustrate a first basis, a second basis and a third basis produced by the simple conventional method combination. All the images are normalized such that a sum of squares of pixel values in each image becomes 1. Each of the images has a size of 200×200 pixels. FIGS. 10C to 10E illustrate the first, second and third bases in each of which 32 elements each including 6×8 pixels are tiled in each of vertical and horizontal directions.

Table 2 collectively shows results of evaluation of similarities with RMSE between the real-part image and the imaginary-part image of the complex amplitude distribution of the sample acquired from the sample image by the simple conventional method combination and the ground truth real-part image and the imaginary-part image of the complex amplitude distribution of the sample illustrated in FIGS. 8D and 8E.

TABLE 1

| | |
|---|---|
| RMSE between real-part image ot complex amplitude distribution of sample acquired from sample image and ground truth real-part image of complex amplitude distribution of sample | 5.4135E−03 |
| RMSE between imaginary-part image of complex amplitude distribution of sample acquired from sample image and ground truth imaginary-part image of complex amplitude distribution of sample | 8.1681E−04 |

TABLE 2

| | |
|---|---|
| RMSE between real-part image of complex amplitude distribution of sample acquired from sample image and ground truth real-part image of complex amplitude distribution of sample | 6.5216E−03 |
| RMSE between imaginary-part image of complex amplitude distribution of sample acquired from sample image and ground truth imaginary-part image of complex amplitude distribution of sample | 6.8089E−03 |

As understood from a comparison between Table 2 and Table 1, the real-part and imaginary-part images acquired in this embodiment are more similar to the ground truth real-part and imaginary-part images of the sample than those acquired by the simple conventional method combination. This is because the rules for producing the intermediate image from the input image are different between this embodiment and the simple conventional method combination as described above, which results in different bases produced by dictionary learning with the produced intermediate image.

Each of the above embodiments can acquire accurate DC components in partial regions of the second image as the output image from the first image as the input image.

Therefore, using each of the above embodiments enables performing a color conversion from an image of a pathological sample stained with a color to an image stained with another color and enables acquiring a complex amplitude distribution of light transmitted through an unknown sample from a sample image produced by image capturing of the sample through a partially or completely coherent imaging system.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiment (s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-263173, filed on Dec. 20, 2013, which is hereby incorporated by reference herein in its entirety.

What is claimed is:

1. An image processing method of producing, from a first image, a second image by using sparse coding, the method comprising when an average pixel value in a partial region of an image is referred to as a DC component, and a component acquired by subtracting the DC component from a pixel value distribution in the partial region is referred to as an AC component:

producing, from the first image, a processing intermediate image having a pixel value distribution in which a difference among multiple pixel values in a partial region of the processing intermediate image is equal to the DC component in a partial region of the first image corresponding to the partial region of the processing intermediate image;

performing a first process of acquiring, by using the AC component in a first partial region extracted in the processing intermediate image and a basis produced by dictionary learning, the AC component in a second partial region; and performing a second process of acquiring a difference among multiple pixel values in the second partial region as the DC component in a partial region of the second image corresponding to the second partial region, wherein the method repeats the first and second processes with changing a position of extracting the first partial region in the processing intermediate image to acquire the DC components in multiple partial regions of the second image.

2. An image processing method according to claim 1, further comprising for producing the basis:

providing training images for the respective first and second images;

producing, from each of the training images, a training intermediate image having a pixel value distribution in which a difference among multiple pixel values in a partial region of the training intermediate image is equal to the DC component in a partial region of the training image corresponding to the partial region of the training intermediate image; and producing the basis by dictionary learning using the AC components in multiple partial regions extracted from the training intermediate image.

3. An image processing method according to claim 1 further comprising performing a third process of acquiring, by using the AC component in the partial region extracted in the first image and an AC component basis produced by dictionary learning, the AC component in the partial region of the second image corresponding to the partial region extracted in the first image, wherein the method repeats the third process with changing a position of extracting the partial region in the first image to acquire the AC components in multiple partial regions in the second image, and the method adds together the AC components acquired in the multiple partial regions of the second image and the DC components acquired therein in each of the corresponding partial regions to produce the second image.

4. An image processing method according to claim 1 of acquiring, as the first image, a sample image produced by imaging of a sample through a partially coherent or completely coherent imaging system and of producing, from the sample image, the second image showing a complex amplitude distribution of light transmitted through the sample, wherein:

the method further comprises performing a third process of acquiring, by using the AC component in a partial region extracted in the sample image and an AC component basis produced by dictionary learning, the AC components in partial regions of a real-part image and an imaginary-part image which are images of a real part and an imaginary part of the complex amplitude distribution of the sample, the partial regions of the real-part and imaginary-part images corresponding to the partial region extracted in the sample image, and the method repeats the third process with changing a position of extracting the partial region in the sample image to calculate the AC component in each of multiple partial regions in the real-part image and in the imaginary-part image, and the method adds together the AC components acquired in the multiple partial regions of each of the real-part image and the imaginary-part image and the DC components acquired therein in each of the corresponding partial regions to acquire the complex amplitude distribution.

5. An image processing method according to claim 3 further comprising for producing the AC component basis:

providing training images for the first and second images or for the sample image and the sample; and producing the AC component basis by dictionary learning using the AC components in multiple partial regions extracted from the training images.

6. A non-transitory computer-readable storage medium storing an image processing program that causes a computer to execute an image process of producing, from a first image, a second image by sparse coding, the image process comprising when an average pixel value in a partial region of an image is referred to as a DC component, and a component acquired by subtracting the DC component from a pixel value distribution in the partial region is referred to as an AC component:

producing, from the first image, a processing intermediate image having a pixel value distribution in which a difference among multiple pixel values in a partial region of the processing intermediate image is equal to the DC component in a partial region of the first image corresponding to the partial region of the processing intermediate image;

performing a first process of acquiring, by using the AC component in a first partial region extracted in the processing intermediate image and a basis produced by dictionary learning, the AC component in a second partial region; and performing a second process of acquiring a difference among multiple pixel values in the second partial region as the DC component in a partial region of the second image corresponding to the second partial region, wherein the image process repeats the first and second processes with changing a position of extracting the first partial region in the processing intermediate image to acquire the DC components in multiple partial regions of the second image.

7. An image processing apparatus configured to produce, from a first image, a second image by sparse coding, the apparatus comprising when an average pixel value in a partial region of an image is referred to as a DC component, and a component acquired by subtracting the DC component from a pixel value distribution in the partial region is referred to as an AC component:

an image producer configured to produce, from the first image, a processing intermediate image having a pixel value distribution in which a difference among multiple pixel values in a partial region of the processing intermediate image is equal to the DC component in a partial region of the first image corresponding to the partial region of the processing intermediate image;

a first processor configured to perform a first process of acquiring, by using the AC component in a first partial region extracted in the processing intermediate image and a basis produced by dictionary learning, the AC component in a second partial region; and a second processor configured to perform a second process of acquiring a difference among multiple pixel values in the second partial region as the DC component in a partial region of the second image corresponding to the second partial region, wherein the image producer is further configured to repeat the first and second processes with changing a position of extracting the first partial region in the processing intermediate image to acquire the DC components in multiple partial regions of the second image.

* * * * *